(12) United States Patent
Stötzel et al.

(10) Patent No.: US 7,749,933 B2
(45) Date of Patent: Jul. 6, 2010

(54) RHEOLOGICAL ADDITIVE

(75) Inventors: Reinhard Stötzel, Borken (DE);
Herbert Pitamitz, Wuppertal (DE);
Lothar Berger, Leipzig (DE); Matthias Heinrich, Leipzig (DE)

(73) Assignee: Ashland-Sudchemie-Kernfest GmbH, Hilden (DE)

( * ) Notice: Subject to any disclaimer, the term of this patent is extended or adjusted under 35 U.S.C. 154(b) by 910 days.

(21) Appl. No.: 10/549,969

(22) PCT Filed: Mar. 18, 2004

(86) PCT No.: PCT/EP2004/002856

§ 371 (c)(1),
(2), (4) Date: Sep. 8, 2006

(87) PCT Pub. No.: WO2004/083321

PCT Pub. Date: Sep. 30, 2004

(65) Prior Publication Data

US 2007/0034115 A1  Feb. 15, 2007

(30) Foreign Application Priority Data

Mar. 19, 2003 (DE) .................. 103 12 203

(51) Int. Cl.
B01J 29/04 (2006.01)
B01J 21/16 (2006.01)
C08C 3/00 (2006.01)
C08K 9/04 (2006.01)

(52) U.S. Cl. ............... 502/60; 502/80; 524/47; 524/445; 524/446

(58) Field of Classification Search .......... 502/62, 502/80; 524/47, 445, 446
See application file for complete search history.

(56) References Cited

U.S. PATENT DOCUMENTS

| 4,015,045 | A | * | 3/1977 | Rinehart ............... 428/410 |
| 4,728,531 | A | * | 3/1988 | Matz et al. ............ 427/541 |
| 4,968,445 | A | * | 11/1990 | Ahmed et al. .......... 510/221 |
| 5,120,465 | A | | 6/1992 | Sare et al. |
| 5,164,433 | A | * | 11/1992 | Ricci et al. ............ 524/47 |
| 5,735,943 | A | | 4/1998 | Cody et al. |
| 5,925,182 | A | * | 7/1999 | Patel et al. ............ 106/266 |
| 6,299,302 | B1 | | 10/2001 | DeBoer et al. |
| 6,444,601 | B1 | * | 9/2002 | Purcell et al. .......... 502/62 |
| 2004/0037894 | A1 | | 2/2004 | Möller et al. |

FOREIGN PATENT DOCUMENTS

| DE | 3704084 | 8/1988 |
| EP | 0509202 | 2/1992 |
| EP | 0675089 | 10/1995 |
| EP | 0751103 | 6/1996 |
| WO | WO88/02389 | 4/1988 |
| WO | WO96/18577 | 6/1996 |

OTHER PUBLICATIONS

Data sheet of the product "Kärlicher Blauton," Karlicher ton-und Schamottwerske Mannheim & Co. KG, 2 pgs.
Key word "Illit (illite)," Römpp-Lexicon Chemie, $10^{th}$ edition (1997) 3 pgs.
Kromer, et al., "Der Einfluβ des Stoffbestandes auf das Verflüssigungsverhalten von Tonen" Wissenschafts-Forum, cfi/Ber DKG 71 (1994) No. 5, pp. 245-249.
Jasmund, et al., "Tonminerale und Tone," Steinkopff Verlag Darmstadt, (1993), pp. 3416-317, 360-363.
Rudolph, et al., "Beitrag zur Kenntnis de Aufbaus und der Zusammensetzung von-Form-und Kernschwärzen," Gieβerei-Praxis 22/92 (1992), pp. 347-358.
A. Weiss, "Die innerkristalline Quellung als allgemeines Modell für Quellungsvorgänge," Chemische Berichte Jahrg. 91 (1958), pp. 487-502.
U. Hofmann, Aus der Chemie der hochquellfähigen tone (Bentonite), Angewandte Chemie, 68, No. 2 (Jan. 21, 1956), pp. 53-80.
Key word "Attapulgit" (attapulgite), Römpps Chemie-Lexikon, Eighth Edition (1979), 2 pgs.
Formulation of "Arkopal T." (1993), 1 pg.
Formulation of "Disopast TN 5000," (1990), 1 pg.
Affidavit of Dr. Klaus Seeger, Chemische Werke GmbH, (Nov. 26, 2007), 3 pgs.
Except of an analysis of article/supplier, (Jan. 5, 1993), 2 pgs.
Huttenes-Albertus Chemische Werke Gmbe, preliminary data sheet concerning "Arkopal T." 1 pg.
Data sheet concerning "Disopast 5000," (Nov. 1997), 1 pg.
Excerpt regarding key work "Poren" (pores), Römpps Chemie-Lexikon, Eighth Edition, (1978), 3 pgs.
Huttenes-Albertus shipping lists, (Feb. 19, 1992 and Mar. 12, 2002), 9 pgs.
Computer-generated hard copy of a certification report according to DIN concerning the product "Arkopal T.," Huttenes-Albertus, (Apr. 27, 2000) 1 pgs.
Affidavit of Thomas Linke, (Nov. 14, 2007), 2 pgs.

(Continued)

*Primary Examiner*—Jerry Lorengo
*Assistant Examiner*—Shuangyi Abu Ali

(57) ABSTRACT

The invention relates to a rheological additive comprising illite clay, smectic clay and an attapulgite suitable for controlling the application characteristics of a coating material for porous bodies.

15 Claims, No Drawings

OTHER PUBLICATIONS

Dieter Heim, "Tone and Tonminerale," 2 pgs.

Wu Guohua, et al, "The Investigation On Properties Of Attapulgite Clay And Its Application For Mould Coating Rheopexy Agent," Indian Foundry Journal, vol. 45, No. 9, Sep. 1999, pp. TP-185-189.

James A. Polon, "The Mechanisms of Thickening by Inorganic Agents," Journal of the Society of Cosmetic Chemists, 21, May 27, 1970, pp. 347-363.

* cited by examiner

RHEOLOGICAL ADDITIVE

The present invention relates to a rheological additive suitable for controlling the application characteristics of a coating material for porous bodies.

Coating porous substances is a technique which is of particular significance in the processing of cores or molds in foundry technology. Furthermore, this technique is important in the ceramics industry, in particular for applying glazes and engobes to raw ceramic bodies. This technique is also used for cardboard or paper.

The coating materials applied to porous bodies can have different purposes. For instance, mold and core coatings in foundry technology serve to influence the surface of the mold or core parts, improve the appearance of the casting, influence the metallurgy of the casting and/or prevent casting flaws. In the ceramics industry, glazes are used to impart an advantageous density, hardness, smoothness and strength as well as color to the ceramic products. Furthermore, in the case of clay ceramic materials, coatings of chromatic clay washes, what are referred to as engobes, are used for surface coloring.

In foundry technology, mold and core parts are usually coated with a refractory material by means of so-called washes which are applied in liquid form with a suitable viscosity using a carrier liquid. The wash coating is supposed to decelerate the heat exchange between the smelt and the casting mold, in particular when the mold or core material has a relatively high degree of heat conductivity and thus has a certain quenching effect. Moreover, the wash coating can reduce the surface roughness of the molds and cores and thus contribute to smooth casting surfaces. Another purpose of the wash coating is to prevent the liquid metal from penetrating the porous mold and core surfaces. Furthermore, the wash can prevent the metal from sticking to the walls of the mold or core and thus guarantee a safe removal of the casting from the mold walls when the mold is emptied. Also, washes can be used to improve the abrasion resistance of the mold or core material and to avoid a washing out or erosion attacks caused by the casting flow. Thus, depending on the object at hand, a distinction can be made between heat-insulating, smoothing and hardening washes and mold-release agents. However, these objects are often combined as well.

In the ceramics industry, the coating of raw ceramic bodies is of particular importance. During glazing, the raw ceramic bodies are provided with a glass-like coating which covers the ceramic products with a thin layer and imparts advantageous material properties to them. In addition to the actual glass formers (also referred to as network formers) as a main component, the coating materials used for glazing usually also comprise so-called network modifiers which impart improved melting properties to the glaze. The sealing effect of glazes protects pored or porous workpieces against the penetration of all kinds of gases and liquids. Furthermore, the glaze layer can significantly improve the mechanical strength of the workpieces and thus increase their serviceability. Due to the smooth surface of the glazed workpieces, they can furthermore meet higher hygienic standards, for example in the food industry. In order to guarantee a maximum resistance of the glazed articles to acids, bases, alcohol, detergents, fuel etc., the surface of the glaze must not exhibit any flaws (cracks, pinholes).

In the coating of porous matters, the application characteristics of the coating material are generally not only determined by the rheology of the coating material but also by the absorption behavior of the porous body and the capability of the cover material to retain carrier liquid. With respect to the absorption behavior of porous bodies, it has to be noted that those with hydraulic binders such as clay, concrete and water glass usually absorb the carrier liquid to an extremely high degree.

The use of standardizing agents, such as for example natural slimes or cellulose derivatives, is known for coating materials on the basis of an aqueous binder system. While these standardizing agents result in a high water retention capability of the cover material, the rheology of the system is affected in that the coating materials exhibit disadvantageous, lower pseudoplasticity properties and flow off in a more viscous manner. This can lead to undesired application features such as drop formation and curtaining as well as to irregular layer thicknesses. Especially when dip coating is used as an application method, it is of the utmost importance to optimize the flow-off behavior of the coating material in order to obtain clear outlines, a uniform layer thickness and a low degree of drop formation.

In principle, every coating material has to be kept in a homogenous state during processing. In particular, a settling of the solids in the suspension has to be prevented. In connection with the required application behavior, the rheological character and the degree of thixotropy of the complex suspensions should meet the desired requirements.

It has not been possible in the prior art to optimize all the important properties of the coating materials at the same time.

For instance, swellable activated sheet silicates have been used as thickening agents for aqueous systems in numerous technical fields. For this purpose, the sheet silicates are subjected to shear forces and dispersed in the system in finely divided form, causing the individual sheet plates to separate from each other to a large degree or completely and thus form a colloidal dispersion or suspension in the system which leads to a gel structure.

The document DE-A-37 040 84 suggests improving the stability of such a gel structure as well as the rheological effectiveness of a thickening agent by adding a long-chain organic polyelectrolyte, such as for example a polysaccharide or heteropolysaccaride with a total molecular weight of at least 2 million, to a swellable activated sheet silicate. Additionally, the components can be reacted with primary or secondary amines and/or an aminofunctional silane for increasing rheological effectiveness.

EP-B-0 751 103 discloses the use of non-calcined smectic clays and organic additives to increase the strength of clay compositions for slip casting complexly shaped ceramic objects.

U.S. Pat. No. 5,164,433 discloses a thickening agent for aqueous systems comprising a clay material, starch and a polymer or copolymer of an unsaturated carboxylic acid, a modified unsaturated carboxylic acid and/or a vinyl monomer.

However, the known thickening agents do not always meet the specific requirements regarding the control of the application characteristics of coating materials for porous bodies, and important properties of the coating materials are not optimized all at the same time.

It was therefore the object of the present invention to provide a rheological additive suitable for controlling the application characteristics of a coating material for porous bodies which allows an advantageous adjustment of the rheological properties of coating materials for porous bodies on the basis of an aqueous binder system.

These objects are achieved by the rheological additive according to the present invention which comprises illite clay, smectic clay and an attapulgite.

The invention furthermore relates to coating materials comprising a rheological additive according to the present invention.

The invention also relates to a process for the production of a coating material according to the present invention characterized in that a rheological additive according to the present invention is introduced into a carrier liquid.

Furthermore, the present invention is directed to processes for coating porous bodies with a coating material comprising the steps:

a) providing a coating material according to the present invention;
b) applying the coating material to a porous body; and
c) drying the coated porous body.

In addition, the invention relates to coated porous bodies which have been coated with a coating material according to the present invention.

The invention also relates to the use of an inventive coating material for coating a porous body.

Finally, the invention relates to the use of a rheological additive according to the present invention for controlling the application characteristics of a coating material for porous bodies.

The invention is based on the surprising finding that by combining an illite clay with a smectic clay and an attapulgite, a rheological additive can be provided which, when introduced into a coating material, does not lead to extreme thickening and thus a loss of pseudoplasticity. Such negative effects are known in the technical field e.g. in connection with systems only containing smectic clay.

According to the present invention, the illite clay is a clay material exhibiting a low degree of swelling behavior. Such swelling behavior is usually observed in clay materials having a kaolinite content of 80 wt.-% or less. All illite-containing clays with an illite content of at least 5 wt.-% can be used in the present invention. The illite content of the illite clay according to the present invention is preferably between 5 and 50 wt.-%, more preferred between 5 and 20 wt.-%, and especially preferred between 5 and 10 wt.-%. Such an illite clay is for example available from the company Kärlicher Ton- and Schamottewerke, Mannheim & Co. KG, Germany, under the trade name "Kärlicher Blauton".

The selection of suitable smectic clays as an additional component of the additive according to the present invention is not restricted. Examples of suitable smectic clays include hectorite, saponite, sauconite, montmorillonite, beidellite and nontronite as well as smectic clay materials such as bentonite. Bentonite has been shown to be especially suitable for solving the problem underlying the present invention. As an example, reference is made to a smectic clay with the trade name "Bentone EW" which can be used in the present invention. It is available from the company Elementis Specialities Inc., Hightstown, N.J., U.S.A.

A rheological additive according to the present invention furthermore comprises an attapulgite. For example, a product of the company Solvadis AG, Frankfurt am Main, Germany, with the trade name "Attagel 40" can be used as attapulgite.

In a preferred embodiment, a rheological additive according to the present invention comprises the components illite clay:smectic clay:attapulgite in this order in a ratio of 1 to 100:1 to 100:1 to 100, more preferred 1 to 30:1 to 20:1 to 20. A ratio of 1 to 4:1 to 2:1 to 2 is especially preferred.

In another preferred embodiment, an inventive rheological additive merely comprises the components illite clay, smectic clay and attapulgite. A rheological additive according to the present invention merely comprising the components illite clay, smectic clay and attapulgite in the above-mentioned ratios is especially preferred.

The rheological additives according to the present invention can be used to control the application characteristics of coating materials for porous bodies.

The coating materials according to the present invention preferably comprise 0.1 to 10 wt.-% of the illite clay, 0.1 to 10 wt.-% of the smectic clay and 0.1 to 10 wt.-% of attapulgite. In an especially preferred embodiment, a coating material according to the present invention comprises 0.1 to 3.0 wt.-% of the illite clay, 0.1 to 2.0 wt.-% of the smectic clay and 0.1 to 2.0 wt.-% of attapulgite.

Conventional coating materials comprise a carrier liquid. The solid components of the coating material can form a suspension together with the carrier liquid which renders the solid components workable so that they can be applied onto the body to be coated by means of a suitable process such as e.g. dip coating. In a preferred embodiment, a coating material according to the present invention comprises a carrier liquid wherein the carrier liquid comprises water as the main component. In addition to water as the main component, the carrier liquid of the present invention can furthermore contain alcohols, such as for example methanol, ethanol, n-propanol, isopropanol, n-butanol, in an amount of up to 10 wt.-%, preferably 5 wt.-% and especially preferred 2 wt.-%. In an especially preferred embodiment, water is the only carrier liquid of a coating material according to the present invention.

As a functional component, conventional coating materials contain at least one basic substance. The purpose of this basic substance is mainly to influence the surface of the body to be coated. For example, in foundry technology the basic substance can seal the sand pores of a core or mold part in order to prevent the penetration of the casting metal. In the ceramics industry, glass or network formers allow the formation of coats in the form of molten glass (glazes) on the ceramic material, which impart, inter alia, improved mechanical properties to the material. Furthermore, chromatic clay washes (engobes) can be used as coloring coats on clay ceramic materials. Cardboard and paper can be coated with clay-containing suspensions to provide smooth surfaces and increase strength.

In a preferred embodiment, a coating material according to the present invention comprises a refractory material as a basic substance. All conventional refractory materials can be used as refractory materials. For example, pyrophyllite, mica, zirconium silicate, andalusite, chamotte, iron oxide, kyanite, bauxite, olivine, aluminum oxide, quartz, talcum, calcined kaolins and/or graphite can be used alone or in combinations at any ratio. Pyrophyllite, mica, zirconium silicate, iron oxide and graphite are especially preferred refractory materials.

For the use in foundry technology, the coating materials according to the present invention furthermore preferably comprise a binder. The purpose of a binder is first and foremost to guarantee the setting of the ingredients of the coating material, in particular of the basic substance, after drying of the coating material that has been applied to a porous body. Preferably, the binder hardens irreversibly and thus results in an abrasion-resistant coating on the porous body. Abrasion resistance is of utmost importance for the coating material since a lack of abrasion resistance can damage the coating. In particular, the binder should not re-soften when exposed to atmospheric moisture. In the present invention, all binders can be used that are employed in conventional aqueous systems. For example, starch, dextrin, peptides, polyvinyl alcohol, polyacrylic acid, polystyrene and/or polyvinyl acetate polyacrylate dispersions can be used. In an especially preferred embodiment of the present invention, the binder comprises starch.

In another preferred embodiment, a coating material according to the present invention comprises glass or network formers as well as network modifiers as basic substances.

All substances that are usually used in the production of glazes on ceramic materials can be used as glass formers and network modifiers. According to the present invention, mixtures of $SiO_2$ and $Al_2O_3$ can for example be used as glass formers, and metal oxides can be used as network modifiers. Basic metal oxides such as for example $Na_2O$, $K_2O$, $CaO$, $BaO$, $Li_2O$, $MgO$, $ZnO$, $PbO$ and $SrO$ are especially preferred for this purpose.

In another preferred embodiment which can be applied for the production of engobes on clay ceramic materials, a coating material according to the present invention comprises a chromatic clay material as basic substance. All materials known and common in the state of the art can be used as chromatic clay material.

In addition to the components already mentioned above, the coating materials can comprise further conventional additives such as for example suspending agents, wetting and dispersing agents, standardizing agents and/or biocides. Cellulose ethers, alginates, mucilages and/or pectins, preferably mucilages, can be used as suspending agents. Examples of suitable wetting and dispersing agents include ionic and non-ionic, preferably non-ionic, tensides. Combinations of anionic polymer compounds, in particular polyphosphates or polyacrylic acid salts, and salts, in particular salts of metals of the first and second main groups, can for example be used as standardizing agents. According to the present invention, formaldehyde, 2-methyl-4-isothiazoline-3-one (MIT), 5-chloro-2-methyl-4-isothiazoline-3-one (CIT) and/or 1,2-benzisothiazoline-3-one (BIT), preferably MIT and/or BIT, can be used as biocides.

Coating materials according to the present invention can be produced by introducing the rheological additives described above into an aqueous binder system. By adding the rheological additive, it is possible to control the application characteristics of the coating material. For producing the coating material, the rheological additive is first digested in the carrier liquid. For this purpose, the rheological additive is added to the carrier liquid in solid or pasty form and digested under stirring using sufficiently high shear forces. Depending on the composition of the rheological additive used, the time needed for opening it up can be critical for an optimum dispersion of the solids added later on. Therefore, digestion times that are too short should be avoided if an optimum control of the rheological properties of the coating materials is to be guaranteed. After the rheological additive has been digested in the carrier liquid, the other components of the coating material, especially the basic substances, can be added in any order.

For commercial distribution, a coating material according to the present invention obtained by the above-mentioned process can be provided in the form of a finished formulated coating material or wash. Furthermore, a coating material according to the present invention can be distributed in the form of a paste. In that case, a suitable amount of carrier liquid necessary to adjust the required viscosity and density properties of the wash has to be added in order to obtain a ready-to-use coating material. Furthermore, the coating material can be sold as a solids mixture in powder form, to which the necessary amount of carrier liquid has to be added to produce a ready-to-use wash. In addition to the carrier liquid, the coating material of the present invention in a ready-to-use state usually has a solids content between 20 and 50 wt.-%, preferably between 30 and 40 wt.-%.

Depending on the field of application of the coating material, the particle sizes of the solids used therein can be significant. For instance, if the coating materials of the present invention are used to coat cores or molds in foundry technology, sufficiently small particle sizes lead to an advantageous surface smoothness of the casting. The particle sizes of the refractory material used according to the present invention for this purpose are preferably between 1 and 500 µm, especially preferred between 10 and 150 µm. When the coating materials of the present invention are used to glaze raw ceramic bodies, the particle size of the glaze batch used for this purpose is preferably 100 µm at most.

Depending on the desired layer thickness of the coating material to be applied, additional characteristic parameters of the coating material can be adjusted. For example, in a preferred embodiment coating materials according to the present invention which are used to coat molds and cores in foundry technology have a viscosity of 12 to 17 s, especially preferred 14 to 16 s (determined according to DIN flow cup 4 mm, Ford cup), and preferably have a density of 20 to 50° Bé, especially preferred 25 to 35° Bé (determined according to the Baumé buoyancy method).

The coating materials of the present invention can be used to coat porous bodies. Surprisingly, the coating materials exhibit an advantageous application behavior when applied to porous bodies. According to the present invention, it is for example possible to increase the water retention capability of the coating substance and at the same time guarantee a quick flow-off behavior. This way, drop formation and curtaining as well as an irregular layer thickness can be prevented.

The coating materials are suitable for all kinds of applications where the coating of porous bodies with coating substances on the basis of an aqueous carrier liquid is desired. The coating materials of the present invention are especially suitable for coating cores and molds in foundry technology. Other examples of preferred porous bodies that can be coated with the coating materials include raw ceramic bodies as well as cardboard and paper. Cores and molds in foundry technology are especially preferred porous bodies. Examples of cores and molds in foundry technology include sand cores which are PUR ColdBox, water glass $CO_2$, MF resol, resol $CO_2$, furan resin, phenolic resin or water glass/ester bonded. Examples of raw ceramic bodies are high-voltage insulators and sanitary articles.

A process for coating porous bodies with a coating material according to the present invention comprises the steps:
a) providing the coating material;
b) applying the coating material to a porous body; and
c) drying the coated porous body.

The coating material provided by the present invention can be applied using all conventional application processes known in the art. Examples include dip coating, flow coating, spray coating and spread coating. The application by means of dip coating is especially preferred.

The time required for the excess coating material to flow off depends on the flowing-off properties of the used coating material. After a sufficient flow-off time, the coated porous piece is subjected to drying. All conventional drying processes, such as for example drying by means of microwaves or convection ovens, can be used. In a preferred embodiment of the invention, the coated porous body is dried at 100 to 250° C., especially preferred 120 to 180° C., in a convection oven.

According to the process of the present invention, porous bodies can be coated with the coating material in a single coating process step. However, depending on the desired thickness of the dry layer, multiple coating is also possible. In a preferred embodiment a porous body that has been coated in a single coating step has a dry layer thickness between 50 and 600 µm, with a dry layer thickness between 150 and 300 µm being especially preferred.

The invention will be described in more detail in the following examples.

EXAMPLES

1. Comparative Example

In the following Comparative Examples, the rheological properties, in particular the thixotropy, as well as the water retention capability of the inventive additive are examined in comparison with the individual components.

For this purpose, separate mixtures of illite clay, smectic clay and attapulgite in water were prepared. The solids were mixed with a suitable amount of water for 5 minutes each by means of a toothed disk. Based on these specifications, the mixtures I to III listed in Table 1 were obtained. Trade names are marked (T).

TABLE 1

| No. | | |
|---|---|---|
| 1 | Mixture I | 30 wt.-% Kärlicher Blauton (T)[a] in water |
| 2 | Mixture II | 10 wt.-% Bentone EW (T)[b] in water |
| 3 | Mixture III | 10 wt.-% Attagel 40 (T)[c] in water |

[a]Kärlicher Blauton; clay material containing 7 wt.-% illite clay (Kärlicher Ton- und Schamottewerke)
[b]Bentone EW, bentonite (Elementis)
[c]Attagel 40, attapulgite (Solvadis)

Furthermore, combinations of the mixtures in ratios of 1:1 and 1:1:1 as listed in Table 2 were prepared. The ratio of mixture 7 approximately corresponds to the ratio of components of the rheological additive of the coating material described in the working example below.

TABLE 2

| No. | |
|---|---|
| 4 | 1 part I + 1 part III |
| 5 | 1 part I + 1 part II |
| 6 | 1 part II + 1 part III |
| 7 | 1 part I + 1 part II + 1 part III |

The rheological properties of the mixtures were examined by means of a Haake RheoStress rheometer. For this, the flow curves of the individual mixtures were recorded and the parameters listed in Table 3 were determined based on the curves.

The thixotropy is determined as the area between the two shear stress curves (increasing and decreasing shear rates). A possibly present activation can be determined directly from the flow curve diagram. The flow limit can be determined as an intercept of the linear regression line. The viscosity values resulting at high shear rates (50 s$^{-1}$) are designated as η∞.

Furthermore, the mixtures are examined with respect to their water retention capability. The water retention capability is defined as the retention time of a liquid that passes out of a porous material. To determine this value, the time needed by the escaping liquid to reach a detector or a detection mark is measured, similar to the principle of liquid chromatography.

For determining the water retention time the suspension to be examined is filled into a glass container and then a strip of filter paper (blue band) is immersed in the suspension perpendicularly. The liquid is drawn from the suspension into the filter paper and rises on the paper strip. After the liquid has reached a certain mark (e.g. 50 mm from the starting point), the time is taken. This time represents the retention time. The longer this time period, the higher the suspension's capability of retaining the liquid.

In the present case, an abstract evaluation system was applied to evaluate the water retention capability. The following symbols are used to describe the water retention capability: ++ very good, + good, ± sufficient, and − poor.

The results are listed in Table 3.

TABLE 3

| No. | Flow behavior | Thixotropy [Pas$^{-1}$] | Activation [Pa] | Flow limit [Pa] | η∞ [Pas] | Water retention capability |
|---|---|---|---|---|---|---|
| 1 | almost Newtonian | 1 | 0 | 1 | 0.1 | ± |
| 2 | strongly thixotropic | 2183 | 0 | 82 | 2.7 | ++ |
| 3 | rheopectic | −13 | 0 | 6 | 0.2 | − |
| 4 | rheopectic | −11 | 0 | 4 | 0.15 | n.d.[a] |
| 5 | strongly thixotropic | 424 | 10 | 44 | 1.1 | n.d.[a] |
| 6 | thixotropic | 181 | 10 | 30 | 0.8 | n.d.[a] |
| 7 | thixotropic | 160 | 5 | 37 | 0.8 | + |

[a]n.d. = not determined

It is clear from Table 3 that the thixotropy of the smectic clay is reduced by the addition of illite clay (no. 5) and especially by the addition of attapulgite (no. 6), to a larger extent than would be the dilution effect. Surprisingly, the high amounts of illite clay, which compared to the other sheet silicates in mixture no. 7 is present in three times the amount, basically do not contribute to the viscosity at high shear gradients (η∞) which implies a quick flow-off behavior of the corresponding coating materials. At the same time, it can be inferred from the data regarding mixture no. 7 that due to the high flow limit and the existing thixotropy—mainly because of the smectic clay—a quick setting and a good flow of the last drop can be expected. The water retention capability is controlled proportionally by the smectic clay content.

2. Working Example

A coating material with the composition listed in Table 4 is prepared. Trade names are marked (T).

TABLE 4

| Component | wt.-% |
|---|---|
| Water | 60.8 |
| Refractory materials | 33.9 |
| Kärlicher Blauton (T)[a] | 2.30 |
| Bentone EW (T)[b] | 0.71 |
| Attagel 40 (T)[c] | 0.75 |
| Starch | 0.80 |
| Wetting and dispersing agents | 0.54 |
| Biocides | 0.20 |

[a]Kärlicher Blauton; clay material containing 7 wt.-% illite clay (Kärlicher Ton- und Schamottewerke)
[b]Bentone EW, bentonite (Elementis)
[c]Attagel 40, attapulgite (Solvadis)

For preparing the coating material, the components biocides, starch, Attagel 40, Kärlicher Blauton and Bentone EW are added to 30 wt.-% water. The mixture is digested for 20 minutes using a dissolver stirred at the highest possible speed. Then the remaining amount of water as well as the dispersing agent and optionally a standardizing agent are added and stirring is continued for another 5 minutes. Then the refractory materials are stirred in. The mixture is stirred for 20 more minutes with the dissolver stirred at the highest speed. Finally, the wetting agent is added and stirring is continued for 10 minutes at a lower speed.

The coating material according to Table 4 was used to coat sand cores bonded according to the PUR ColdBox process. Compared to a coating material not comprising a rheological additive according to the present invention water retention can be doubled.

Also, a comparatively quick flow-off behavior could be observed. Drop formation and curtaining could be avoided. The coated cores showed a uniform layer thickness.

The invention claimed is:

1. A coating material comprising a rheological additive comprising illite clay, smectic clay and an attapulgite; wherein the components illite clay:smectic clay:attapulgite are present in the ratio of 1 to 100:1 to 100:1 to 100 by weight; wherein the coating material comprises
    0.1 to 10 wt.-% of the illite clay,
    0.1 to 10 wt.-% of the smectic clay, and
    0.1 to 10 wt.-% of the attapulgite; and
wherein the coating material further comprises a binder.

2. The coating material according to claim 1 comprising 0.1 to 3.0 wt.-% of the illite clay, 0.1 to 2.0 wt.-% of the smectic clay and 0.1 to 2.0 wt.-% of the attapulgite.

3. The coating material according to claim 1, furthermore comprising a carrier liquid, wherein the carrier liquid comprises water as the main component.

4. The coating material according to claim 1, furthermore comprising a refractory material.

5. The coating material according to claim 4, wherein the refractory material comprises pyrophyllite, mica and/or zirconium silicate.

6. The coating material according to claim 1, furthermore comprising a glass former and a network modifier.

7. The coating according to claim 6, wherein the glass former comprises $SiO_2$ and $Al_2O_3$ and the network modifier is selected from $Na_2O$, $K_2O$, $CaO$, $BaO$, $Li_2O$, $MgO$, $ZnO$, $PbO$ and $SrO$.

8. A process for the production of a coating material according to claim 4, comprising the steps of
    a) providing a rheological additive comprising illite clay, smectic clay and an attapulgite, wherein the components illite clay:smectic clay:attapulgite are present in the ratio of 1 to 100:1 to 100:1 to 100 by weight, and
    b) introducing the rheological additive into a carrier liquid; wherein the coating material comprises
    0.1 to 10 wt.-% of the illite clay,
    0.1 to 10 wt.-% of the smectic clay, and
    0.1 to 10 wt.-% of the attapulgite; and
wherein the coating material further comprises a binder.

9. A process for coating porous bodies with a coating material comprising the steps:
    a) providing a coating material according to claim 4;
    b) applying the coating material to a porous body; and
    c) drying the coated porous body.

10. The process according to claim 9, wherein the porous body is a core or a mold for use in foundry technology.

11. The process according to claim 9, wherein the porous body is a raw ceramic body.

12. The process according to claim 9, wherein the porous body is cardboard or paper.

13. The process according to claim 9, wherein the material is applied to the porous body by means of a dip coating process.

14. A coated porous body onto which the coating material according to claim 1 has been applied.

15. A method of controlling the application characteristics of a coating material for porous bodies, comprising
    a) identifying coating material components to be applied to a porous body to impart an intended effect on the porous body;
    b) determining the desired rheological properties of a coating material comprising the coating material components of step a) required to achieve predetermined application characteristics of the coating material; and
    c) mixing a theological additive comprising illite clay, smectic clay and an attapulgite; wherein the components illite clay:smectic clay:attapulgite are present in the ratio of 1 to 100:1 to 100:1 to 100 by weight;
with the coating material components in an amount effective to achieve the desired rheological properties of the coating material as determined in step b), wherein the resulting coating material comprises
    0.1 to 10 wt.-% of the illite clay,
    0.1 to 10 wt.-% of the smectic clay,
    0.1 to 10 wt.-% of the attapulgite, and
    a binder.

* * * * *

UNITED STATES PATENT AND TRADEMARK OFFICE
CERTIFICATE OF CORRECTION

PATENT NO.        : 7,749,933 B2
APPLICATION NO. : 10/549969
DATED             : July 6, 2010
INVENTOR(S)       : Reinhard Stötzel et al.

It is certified that error appears in the above-identified patent and that said Letters Patent is hereby corrected as shown below:

COLUMN 9
Line 44: "4" should be --1--.

COLUMN 10
Line 11: "4" should be --1--.
Line 34: "theological" should be --rheological--.

Signed and Sealed this

Nineteenth Day of October, 2010

David J. Kappos
*Director of the United States Patent and Trademark Office*